(12) United States Patent
Liu et al.

(10) Patent No.: US 11,109,464 B2
(45) Date of Patent: *Aug. 31, 2021

(54) LED DRIVING CIRCUIT AND LED APPARATUS

(71) Applicant: XIAMEN ECO LIGHTING CO. LTD., Xiamen (CN)

(72) Inventors: Qi Liu, Xiamen (CN); Zongyan Liu, Xiamen (CN); Qiyuan Wang, Xiamen (CN); Yongjun Bao, Xiamen (CN)

(73) Assignee: XIAMEN ECO LIGHTING CO. LTD., Xiamen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/830,906

(22) Filed: Mar. 26, 2020

(65) Prior Publication Data

US 2020/0229281 A1 Jul. 16, 2020

Related U.S. Application Data (63) Continuation of application No. 16/248,330, filed on Jan. 15, 2019, now Pat. No. 10,638,567.

(30) Foreign Application Priority Data

Oct. 16, 2018 (CN) .......................... 201821677932.X (51) Int. Cl.
| | | |
|---|---|---|
| *H05B 45/50* | (2020.01) | |
| *F21K 9/278* | (2016.01) | |
| *H05B 45/37* | (2020.01) | |
| *F21Y 103/10* | (2016.01) | |
| *F21Y 115/10* | (2016.01) | |
| *H02M 7/06* | (2006.01) | |

(52) U.S. Cl.
CPC ............. *H05B 45/50* (2020.01); *F21K 9/278* (2016.08); *H05B 45/37* (2020.01); *F21Y 2103/10* (2016.08); *F21Y 2115/10* (2016.08); *H02M 7/06* (2013.01)

(58) Field of Classification Search
CPC ........ H05B 45/50; H05B 45/00; H05B 45/37; F21K 9/278; F21Y 2103/10; F21Y 2115/10; H02M 7/06
See application file for complete search history.

(56) References Cited

U.S. PATENT DOCUMENTS

| | | | | |
|---|---|---|---|---|
| 9,674,910 | B1 * | 6/2017 | Shih | .................... H05B 45/3578 |
| 9,913,336 | B2 * | 3/2018 | Xiong | ..................... H05B 45/37 |
| 10,021,742 | B2 * | 7/2018 | Jiang | .................... H05B 45/395 |

(Continued)

*Primary Examiner* — Raymond R Chai
(74) *Attorney, Agent, or Firm* — Chun-Ming Shih; Lanway IPR Services (57) ABSTRACT

A driving circuit includes: a first connecting port for receiving a first signal during a first operating mode; a second connecting port for receiving a second signal during the first operating mode or receiving a third signal during a second operating mode; a first driving unit coupled to the first connecting port and the second connecting port, for driving an LED element according to the first signal and the second signal during the first operating mode; and a second driving unit coupled to the second connecting port, for driving the LED element according to the third signal during the second operating mode; wherein the second operating mode is different from the first operating mode.

14 Claims, 7 Drawing Sheets

(56) References Cited

U.S. PATENT DOCUMENTS

| | | | |
|---|---|---|---|
| 10,190,732 B2* | 1/2019 | Li | F21V 25/02 |
| 10,378,700 B2* | 8/2019 | Liu | F21K 9/278 |
| 2016/0381760 A1* | 12/2016 | Xiong | F21K 9/278 |
| | | | 315/123 |
| 2017/0006672 A1* | 1/2017 | Barneston | H05B 45/31 |
| 2017/0094746 A1* | 3/2017 | Xiong | F21V 29/83 |
| 2017/0105263 A1* | 4/2017 | Xiong | F21K 9/275 |

* cited by examiner

LED DRIVING CIRCUIT AND LED APPARATUS

RELATED APPLICATION

The present application is a continued application of U.S. patent application Ser. No. 16/248,330.

FIELD

The present invention is related to a LED driver circuit and more particularly related to a LED driver circuit used for a LED apparatus with multiple modes.

BACKGROUND

Currently, an LED tube may either be plugged into the AC electric power supply or a power supply system having an inductance ballast. The LED tube is not adapted to the AC electric power supply, the power supply system having an inductance ballast, and the power supply system having an electrical ballast. Therefore, a fluorescent lamp/tube used in the power supply system having the electrical ballast may not be directly replaced with an LED tube when the fluorescent lamp/tube is burned. Moreover, when an LED tube is applied to the power supply system having the inductance ballast, and when the inductance ballast malfunctions, the LED tube also fails to work properly because the failed inductance ballast may block the AC electric power supply from the LED tube. Accordingly, there is a need to provide an LED driver adapted to the AC electric power supply, the power supply system having an inductance ballast, and the power supply system having an electrical ballast.

SUMMARY

Embodiments of the present invention provide a driving circuit. The driving circuit comprises a first connecting port, a second connecting port, a first driving unit, and a second driving unit. The first connecting port is arranged for receiving a first signal during a first operating mode. The second connecting port is arranged for receiving a second signal during the first operating mode or receiving a third signal during a second operating mode. The first driving unit is coupled to the first connecting port and the second connecting port, for driving an LED element according to the first signal and the second signal during the first operating mode. The second driving unit is coupled to the second connecting port, for driving the LED element according to the third signal during the second operating mode. The second operating mode is different from the first operating mode.

In one embodiment, the first connecting port and the second connecting port are arranged to receive a fourth signal and a fifth signal during a third operating mode, the second driving unit is arranged to drive the LED element according to the fourth signal and the fifth signal during the third operating mode, and the third operating mode is different from the first operating mode and the second operating mode.

In one embodiment, the first driving unit is enabled and the second driving unit is disabled during the first operating mode, the first driving unit is disabled and the second driving unit is enabled during the second operating mode, and the first driving unit is disabled and the second driving unit is enabled during the third operating mode.

In one embodiment, the first driving unit comprises: a switching control circuit, having an input terminal coupled to the first connecting port and an output terminal for generating a control signal; a switching module, having an input terminal coupled to the output terminal of the switching control circuit, and an output terminal for outputting an output signal according to the control signal; and a rectifying and filtering circuit, coupled to the output terminal of the switching module, for driving the LED element according to the output signal during the first operating mode.

In one embodiment, the switching module comprises: a relay circuit, configured to have a coil, a moving contact, and a stationary contact; wherein the coil of the relay circuit is coupled to the switching control circuit, the moving contact of the relay circuit is coupled to the first connecting port, and the stationary contact of the relay circuit is coupled to the rectifying and filtering circuit for generating the output signal according to the control signal.

In one embodiment, the switching control circuit comprises: a transformer, having a primary coil and a secondary coil, the primary coil coupled to the first connecting port, and the secondary coil magnetically coupled to the primary coil; a first rectifier, coupled between the secondary coil of the transformer and a ground voltage, for generating a first rectifying signal; a voltage converter, coupled to the first rectifier, having an output terminal for generating a converting output voltage according to the first rectifying signal; a first capacitor, coupled to the primary coil of the transformer; a second capacitor, coupled with the first rectifier in parallel; a third capacitor, coupled between the output terminal of the voltage converter and the ground voltage; and a first Zener diode, coupled with the second capacitor in parallel.

In one embodiment, the rectifying and filtering circuit comprises: a second rectifier, having a first input terminal coupled to the second connecting port and the first capacitor and a second input terminal coupled to the output terminal of the switching module, and having a first output terminal and a second output terminal for generating a second rectifying signal to drive the LED element during the first operating mode; a second Zener diode, coupled between the first output terminal and the second output terminal of the second rectifier; and a fourth capacitor, coupled between the first output terminal and the second output terminal of the second rectifier.

In one embodiment, the second driving unit comprises: a rectifying circuit, coupled to the second connecting port, for generating a rectifying signal; a filtering circuit, coupled to the rectifying circuit, for filtering the rectifying signal to generate a filtering signal; and a voltage level converting circuit, coupled to the filtering circuit, for driving the LED element according to the filtering signal during the second operating mode and the third operating mode; wherein the rectifying circuit, the filtering circuit, and the voltage level converting circuit are connected sequentially.

In one embodiment, the rectifying circuit comprises: a rectifier, having a first input terminal and a second input terminal coupled to the second connecting port, a first output terminal outputting the rectifying signal, and a second output terminal coupled to a ground voltage.

In one embodiment, the filtering circuit comprises: an inductor, having a first terminal coupled to the first output terminal of the rectifier and a second terminal outputting the filtering signal; a resistor, having a first terminal and a second terminal coupled to the first terminal and the second terminal of the inductor respectively; and a capacitor, having a first terminal coupled to the second terminal of the inductor, and a second terminal coupled to the ground voltage.

In one embodiment, the driving circuit further comprises: a first filament simulation circuit, having a first input terminal coupled to a first terminal of the first connecting port, a second input terminal coupled to a second terminal of the first connecting port, and an output terminal coupled to the first driving unit; and a second filament simulation circuit, having a first input terminal coupled to a first terminal of the second connecting port, a second input terminal coupled to a second terminal of the second connecting port, a first output terminal coupled to the first driving unit and the second driving unit, and a second output terminal coupled to the second driving unit.

In one embodiment, the first filament simulation circuit comprises: a first resistor, having a first terminal and a second terminal coupled to the first terminal and the second terminal of the first connecting port respectively; a first inductor, having a first terminal coupled to the first terminal of the first resistor; a second inductor, having a first terminal coupled to the second terminal of the first resistor; a second resistor, having a first terminal and a second terminal coupled to a second terminal of the first inductor and a second terminal of the second inductor respectively; and a capacitor, having a first terminal and a second terminal coupled to the second terminal of the first inductor and the second terminal of the second inductor respectively.

In one embodiment, the driving circuit further comprises: a fuse, having a first terminal coupled to the first terminal of the first connecting port, and a second terminal coupled to the first terminal of the first resistor.

In one embodiment, the second filament simulation circuit comprises: a first inductor, having a first terminal coupled to the first terminal of the second connecting port; a second inductor, having a first terminal coupled to a the second terminal of the second connecting port; a capacitor, having a first terminal and a second terminal coupled to a second terminal of the first inductor and a second terminal of the second inductor respectively; a first resistor, having a first terminal coupled to the second terminal of the first inductor; and a second resistor, having a first terminal coupled to a second terminal of the first resistor, and a second terminal coupled to the second terminal of the second connecting port.

In one embodiment, the driving circuit further comprises: a fuse, having a first terminal coupled to the first terminal of the first connecting port, and a second terminal coupled to the first terminal of the first resistor.

Embodiments of the present invention provide a light emitting diode (LED) apparatus. The LED apparatus comprises a first connecting port, a second connecting port, a first driving unit, and a second driving unit. The first connecting port is arranged to selectively couple to the electrical ballast or an inductance ballast. The second connecting port, arranged to selectively couple to the electrical ballast, the AC electric power supply, or the inductance ballast. The first driving unit is coupled to the first connecting port and the second connecting port, for driving an LED element when the first connecting port and the second port are coupled to the electrical ballast. The second driving unit is coupled to the second connecting port, for driving the LED element when the second connecting port is coupled to the AC electric power supply or when the first connecting port and the second connecting port are coupled to the inductance ballast and the AC electric power supply.

In one embodiment, the first driving unit is enabled and the second driving unit is disabled when the first connecting port and the second port are coupled to the electrical ballast, the first driving unit is disabled and the second driving unit is enabled when the second connecting port is coupled to the AC electric power supply, and the first driving unit is disabled and the second driving unit is enabled when the first connecting port and the second connecting port are coupled to the inductance ballast and the AC electric power supply.

In one embodiment, the first driving unit comprises: a switching control circuit, having an input terminal coupled to the first connecting port and an output terminal for generating a control signal; a switching module, having an input terminal coupled to input terminal of the switching control circuit, and an output terminal for outputting an output signal according to the control signal; a rectifying and filtering circuit, coupled to the output terminal of the switching module, for driving the LED element according to the output signal during the first operating mode.

In one embodiment, the second driving unit comprises: a rectifying circuit, coupled to the second connecting port, for generating a rectifying signal; a filtering circuit, coupled to the rectifying circuit, for filtering the rectifying signal to generate a filtering signal; and a voltage level converting circuit, coupled to the filtering circuit, for driving the LED element according to the filtering signal during the second operating mode and the third operating mode; wherein the rectifying circuit, the filtering circuit, and the voltage level converting circuit are connected sequentially.

In one embodiment, the driving circuit further comprises: a first filament simulation circuit, having a first input terminal coupled to a first terminal of the first connecting port, a second input terminal coupled to a second terminal of the first connecting port, and an output terminal coupled to the first driving unit; and a second filament simulation circuit, having a first input terminal coupled to a first terminal of the second connecting port, a second input terminal coupled to a second terminal of the second connecting port, a first output terminal coupled to the first driving unit and the second driving unit, and a second output terminal coupled to the second driving unit.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "about" means within an acceptable standard error of the mean when considered by one of ordinary skill in the art. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the term "about." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as from one end point to another end point or between two end points. All ranges disclosed herein are inclusive of the end points, unless specified otherwise.

Figure 1:
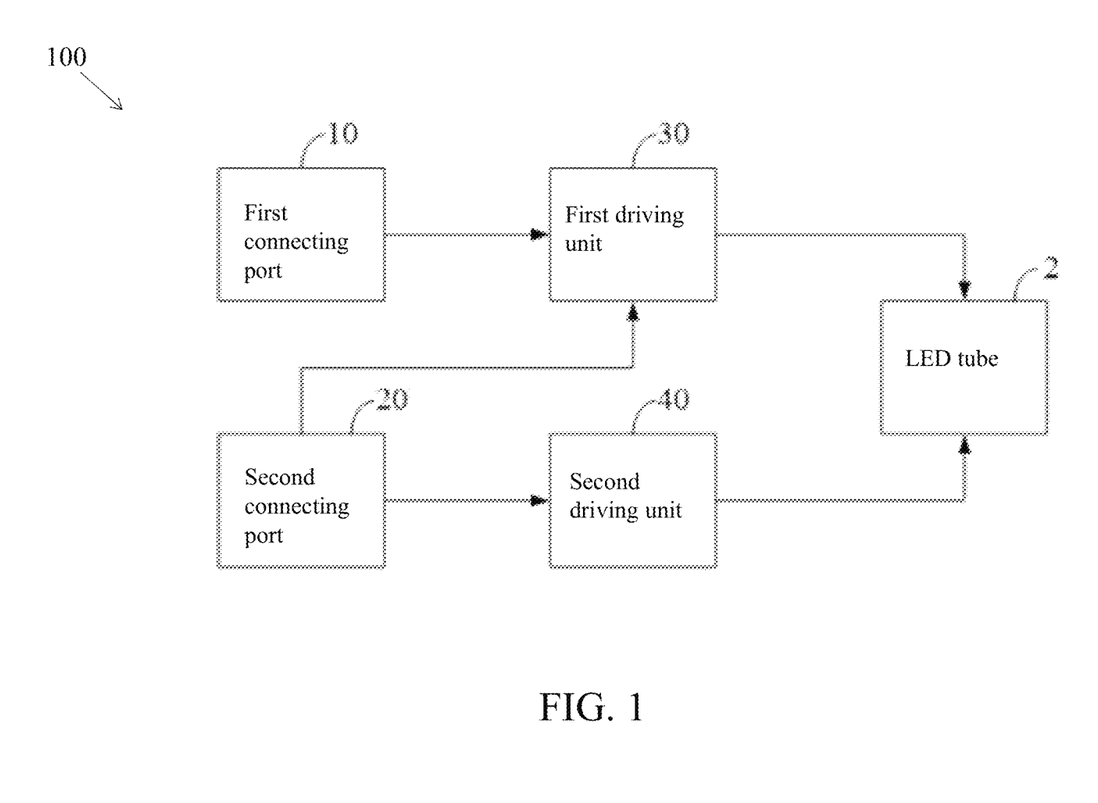
FIG. 1 is a diagram illustrating an LED driving circuit in accordance with some embodiments.

FIG. 1 is a diagram illustrating an LED driving circuit 100 in accordance with some embodiments. The LED driving circuit 100 may be arranged to drive an LED element, wherein the LED element may be an LED tube. According to some embodiments, the LED driving circuit 100 is a multifunctional driving circuit that may be adapted to different power supply systems. For example, the LED driving circuit 100 may be adapted to the electrical ballast, the AC electric power supply, and the inductance ballast. FIG. 1 merely shows the main functional blocks of the LED driving circuit 100. For brevity, an LED tube 2 is also shown in FIG. 1.

According to some embodiments, the LED driving circuit 100 is electrically coupled to the LED tube 2 in order to drive the LED tube 2. The LED driving circuit 100 comprises a first connecting port 10, a second connecting port 20, a first driving unit 30, and a second driving unit 40. The first driving unit 30 is coupled to the first connecting port 10, the second connecting port 20, and the LED tube 2. The second driving unit 40 is coupled to the second connecting port 20 and the LED tube 2. According to some embodiments, the first connecting port 10 and the second connecting port 20 may be selectively coupled an electrical ballast, an inductance ballast, or AC electric power supply. Depending on the power supply system, the LED tube 2 may be controlled by the first driving unit 30 or the second driving unit 40. Specifically, when the first connecting port 10 and the second connecting port 20 are coupled to an electrical ballast, the first driving unit 30 is arranged to drive the LED tube 2. When the second connecting port 20 is coupled to the AC electric power supply, the second driving unit 40 is arranged to drive the LED tube 2. When the first connecting port 10 and the second connecting port 20 are coupled to an inductance ballast, the second driving unit 40 is arranged to drive the LED tube 2.

Accordingly, depending on the signals received by the first connecting port 10 and the second connecting port 20, one of the first driving unit 30 and the second driving unit 40 is arranged to drive the LED tube 2. According to some embodiments, the LED driving circuit 100 may have three operating modes, i.e. the first operating mode, the second operating mode, and the third operating mode. During the first operating mode, the first connecting port 10 and the second connecting port 20 are coupled to an electrical ballast for receiving a first signal and a second signal respectively, and the first driving unit 30 is arranged to drive the LED tube 2 according to the first signal and the second signal. During the second operating mode, the second connecting port 20 is coupled to the AC electric power supply for receiving a third signal, and the second driving unit 40 is arranged to drive the LED tube 2 according to the third signal. During the third operating mode, the first connecting port 10 and the second connecting port 20 are coupled to an inductance ballast for receiving a fourth signal and a fifth signal, and the second driving unit 40 is arranged to drive the LED tube 2 according to the fourth signal and the fifth signal. Furthermore, the first driving unit 30 may be enabled and the second driving unit 40 may be disabled during the first operating mode. The first driving unit 30 may be disabled and the second driving unit 40 may be enabled during the second operating mode. The first driving unit 30 may be disabled and the second driving unit 40 may be enabled during the third operating mode.

Figure 2:
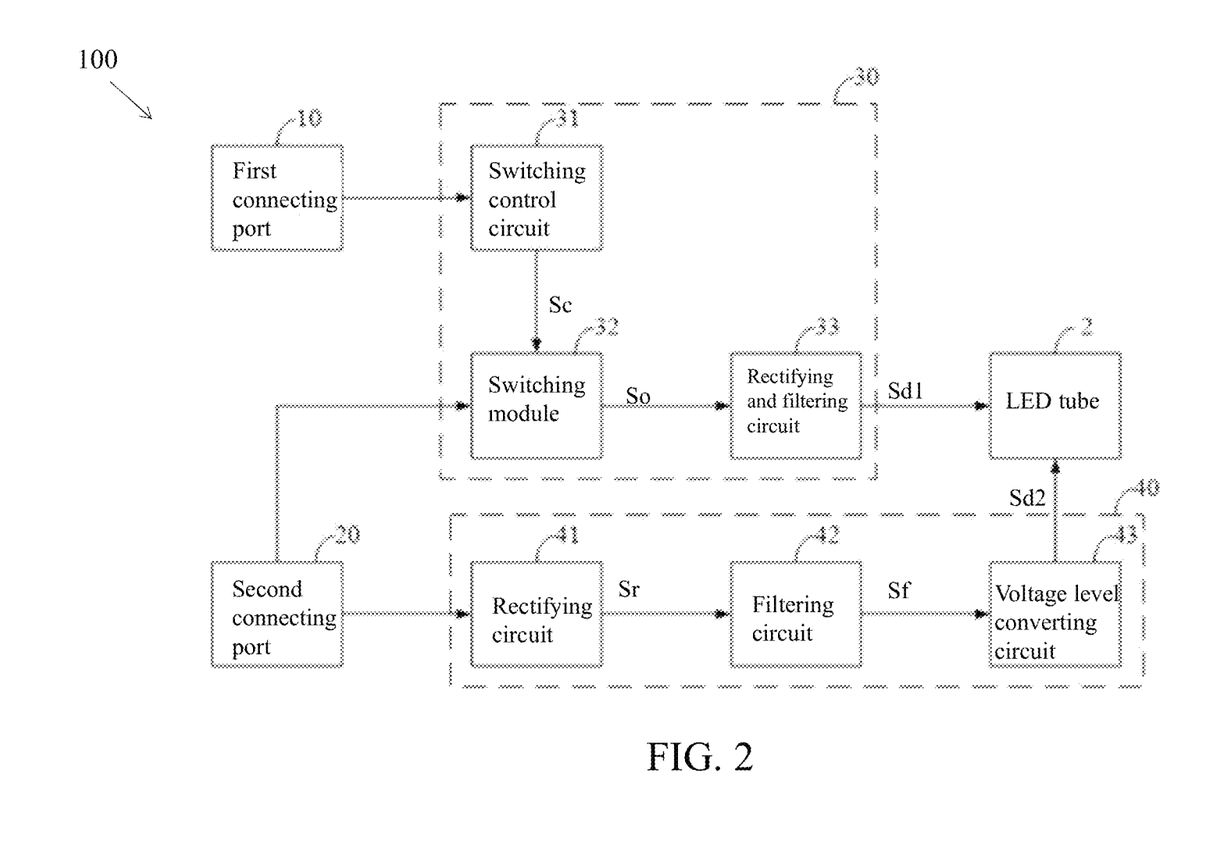
FIG. 2 is a diagram illustrating a first driving unit and a second driving unit of the LED driving circuit in accordance with some embodiments.

FIG. 2 is a diagram illustrating the first driving unit 30 and the second driving unit 40 of the LED driving circuit 100 in accordance with some embodiments. For the purpose of description, the first connecting port 10, the second connecting port 20, and the LED tube 2 are also shown in FIG. 2. According to some embodiments, the first driving unit 30 comprises a switching control circuit 31, a switching module 32, and a rectifying and filtering circuit 33. The switching control circuit 31 has an input terminal coupled to the first connecting port 10 and an output terminal for generating a control signal Sc according to the signal on the first connecting port 10. The switching module 32 has a first input terminal and a second input terminal coupled to the output terminal of the switching control circuit 32 and the second connecting port 20 respectively, and an output terminal for outputting an output signal So according to the control signal Sc and the signal on the second connecting port 20. The rectifying and filtering circuit 33 is coupled to the output terminal of the switching module 32 for generating a first driving signal Sd1 to drive the LED tube 2 according to the output signal So during the first operating mode.

According to some embodiments, the second driving unit 40 comprises a rectifying circuit 41, a filtering circuit 42, and a voltage level converting circuit 43. The rectifying circuit 41 is coupled to the second connecting port 20 for generating a rectifying signal Sr according to the signal on the second connecting port 20. The filtering circuit 42 is coupled to the rectifying circuit 41 for filtering the rectifying signal Sr to generate a filtering signal Sf. The voltage level converting circuit 43 is coupled to the filtering circuit 42 for generating a second driving signal Sd2 to drive the LED tube 2 according to the filtering signal Sf during the second operating mode and the third operating mode. Moreover, the rectifying circuit 41, the filtering circuit 42, and the voltage level converting circuit 43 are connected sequentially.

Figure 3:
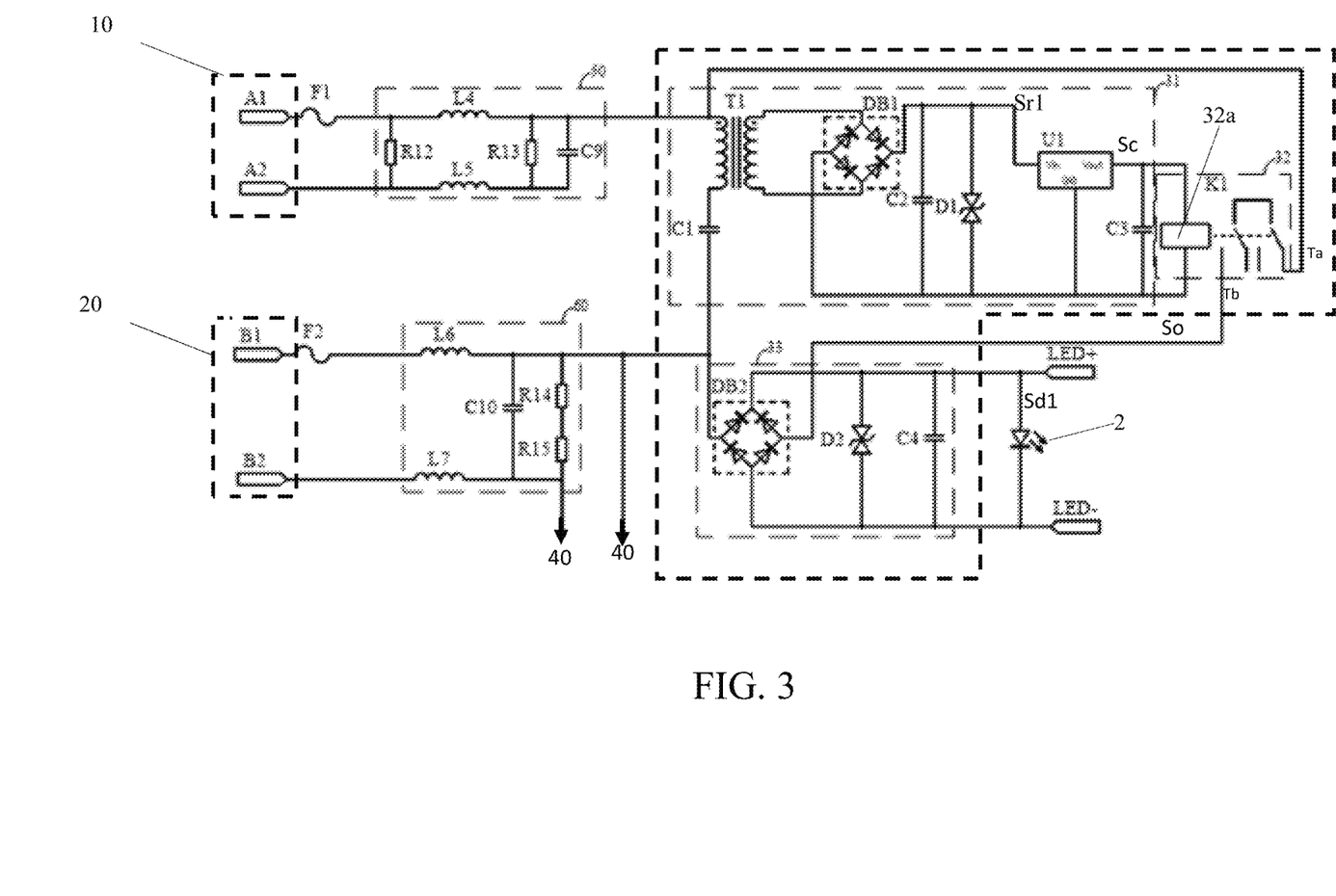
FIG. 3 is a diagram illustrating a first connecting port, a second connecting port, a first fuse, a second fuse, a first filament simulation circuit, a second filament simulation circuit, and a first driving unit of the LED driving circuit in accordance with some embodiments.

Moreover, according to some embodiments, the LED driving circuit 100 further comprises a first fuse, a second fuse, a first filament simulation circuit, and a second filament simulation circuit. FIG. 3 is a diagram illustrating the first connecting port 10, the second connecting port 20, the first fuse F1, the second fuse F2, the first filament simulation circuit 50, the second filament simulation circuit 60, and the first driving unit 30 of the LED driving circuit 100 in accordance with some embodiments. For the purpose of description, the LED tube 2 is also shown in FIG. 2.

The first connecting port 10 comprises a first terminal A1 and a second terminal A2. The second connecting port 20 comprises a first terminal B1 and a second terminal B2. The first fuse F1 is coupled between the first terminal A1 and the first filament simulation circuit 50. The second fuse F2 is coupled between the first terminal B1 and the second filament simulation circuit 60. The first fuse F1 and the second fuse F2 may be the overcurrent protection devices. When the abnormal large current flows to the first connecting port 10 and/or the second connecting port 20, the first fuse F1 and/or the second fuse F2 may be timely fused or opened to protect the first driving unit 30 and/or the second driving unit 40.

The first filament simulation circuit 50 has a first input terminal coupled to the first fuse F1, a second input terminal coupled to the second terminal A2 of the first connecting port 10, and an output terminal coupled to the first driving unit 30. The second filament simulation circuit 60 has a first input terminal coupled to the second fuse F2, a second input terminal coupled to the second terminal B2 of the second connecting port 20, a first output terminal coupled to the first driving unit 30 and the second driving unit, and a second output terminal coupled to the second driving unit 40.

The first filament simulation circuit 50 comprises a first resistor R12, a first inductor L4, a second inductor L5, a second resistor R13, and a capacitor C9. The first resistor R12 has a first terminal and a second terminal coupled to the first terminal A1 (or the first fuse F1) and the second terminal A2 of the first connecting port 10 respectively. The first inductor L4 has a first terminal coupled to the first terminal of the first resistor R12. The second inductor L5 has a first terminal coupled to the second terminal of the first resistor R12. The second resistor R13 has a first terminal and a second terminal coupled to a second terminal of the first inductor L4 and a second terminal of the second inductor L5 respectively. The capacitor C9 has a first terminal and a second terminal coupled to the second terminal of the first inductor L4 and the second terminal of the second inductor L5 respectively.

The second filament simulation circuit 60 comprises a first inductor L6, a second inductor L7, a capacitor C10, a first resistor R14, and a second resistor R15. The first inductor L6 has a first terminal coupled to the second fuse F2 (or B1), and a second terminal coupled to the first driving unit 30 and the second driving unit 40. The second inductor L7 has a first terminal coupled to the second terminal B2 of the second connecting port 20, and a second terminal coupled to the second driving unit 40. The capacitor C10 has a first terminal and a second terminal coupled to the second terminal of the first inductor L6 and a second terminal of the second inductor L7 respectively. The first resistor R14 has a first terminal coupled to the second terminal of the first inductor L6. The second resistor R15 has a first terminal coupled to a second terminal of the first resistor R14, and a second terminal coupled to the second terminal B2 of the second connecting port 20 and the second driving unit 40.

According to some embodiments, the first filament simulation circuit 50 and the second filament simulation circuit 60 are used to simulate generation of tube Voltage of fluorescent tubes so as to be compatible with the electrical/inductance ballasts in the fluorescent tubes and fulfill functions of the electrical/inductance ballasts in detecting tube Voltage, filament resistance, multi stage pre-heating states of tube, multi-stage wattage and the like.

The switching control circuit 31 comprises a transformer T1, a first rectifier DB1, a voltage converter U1, a first capacitor C1, a second capacitor C2, a third capacitor C3, and a Zener diode D1. The transformer T1 has a primary coil and a secondary coil, the primary coil has a first terminal coupled to the second terminal of the inductor L4, and the secondary coil is magnetically coupled to the primary coil. The first rectifier DB1 comprises four diodes connected in a circle. The first rectifier DB1 has a first terminal coupled to a first terminal of the secondary coil of the transformer T1, a second terminal coupled to a second terminal of the secondary coil of the transformer T1, a third terminal coupled to the ground voltage, and a fourth terminal generating a first rectifying signal Sr1.

The voltage converter U1 is coupled to the first rectifier DB1, and the voltage converter U1 has an output terminal for generating a converting output voltage (i.e. the control signal Sc) according to the first rectifying signal Sr1. The first capacitor C1 has a first terminal coupled to a second terminal of the primary coil of the transformer T1, and a second terminal coupled to the rectifying and filtering circuit 33. The second capacitor C2 has a first terminal coupled to the fourth terminal of the first rectifier DB1, and a second terminal coupled to the ground voltage, i.e. the second capacitor C2 and the first rectifier DB1 is connected in parallel. The third capacitor C3 has a first terminal coupled the output terminal of the voltage converter U1, and a second terminal coupled to the ground voltage. The Zener diode D1 has a first terminal coupled to the fourth terminal of the first rectifier DB1 and a second terminal coupled to the ground voltage, i.e. the Zener diode D1 and the second capacitor C2 are connected in parallel.

The switching module 32 comprises a relay circuit K1. The relay circuit K1 is configured to have a coil 32a, a moving contact Ta, and a stationary contact Tb. The coil 32a of the relay circuit K1 is coupled to the switching control circuit 31, the moving contact Ta of the relay circuit K1 is coupled to the first terminal of the first primary coil of the transformer T1, and the stationary contact Tb of the relay circuit K1 is coupled to the rectifying and filtering circuit 33 for generating the output signal So according to the control signal Sc. When the first connecting port 10 is coupled to an electrical ballast, the current flows to the coil 32a of the relay circuit K1 from the switching control circuit 31, and the relay circuit K1 is conducted such that the rectifying and filtering circuit 33 is conducted to drive the LED tube 2. In another embodiment, the switching module 32 may be a triode, a controllable electronic switch, or a switching module formed by the controllable electronic switches.

The rectifying and filtering circuit 33 comprises a second rectifier DB2, a Zener diode D2, and a capacitor C4. The second rectifier DB2 comprises four diodes connected in a circle. The second rectifier DB2 has a first terminal coupled a second terminal of the capacitor C1 and the second terminal of the inductor L6, a second terminal coupled to the relay circuit K1 for receiving the output signal So, a third terminal generating a second rectifying signal (i.e. Sd1) for driving the LED tube 2 during the first operating mode, and a fourth terminal coupled to the ground voltage. The Zener diode D2 has a first terminal coupled to the third terminal of the second rectifier DB2, and a second terminal coupled to the ground voltage. The capacitor C4 has a first terminal coupled to the third terminal of the second rectifier DB2, and a second terminal coupled to the ground voltage.

Figure 4:
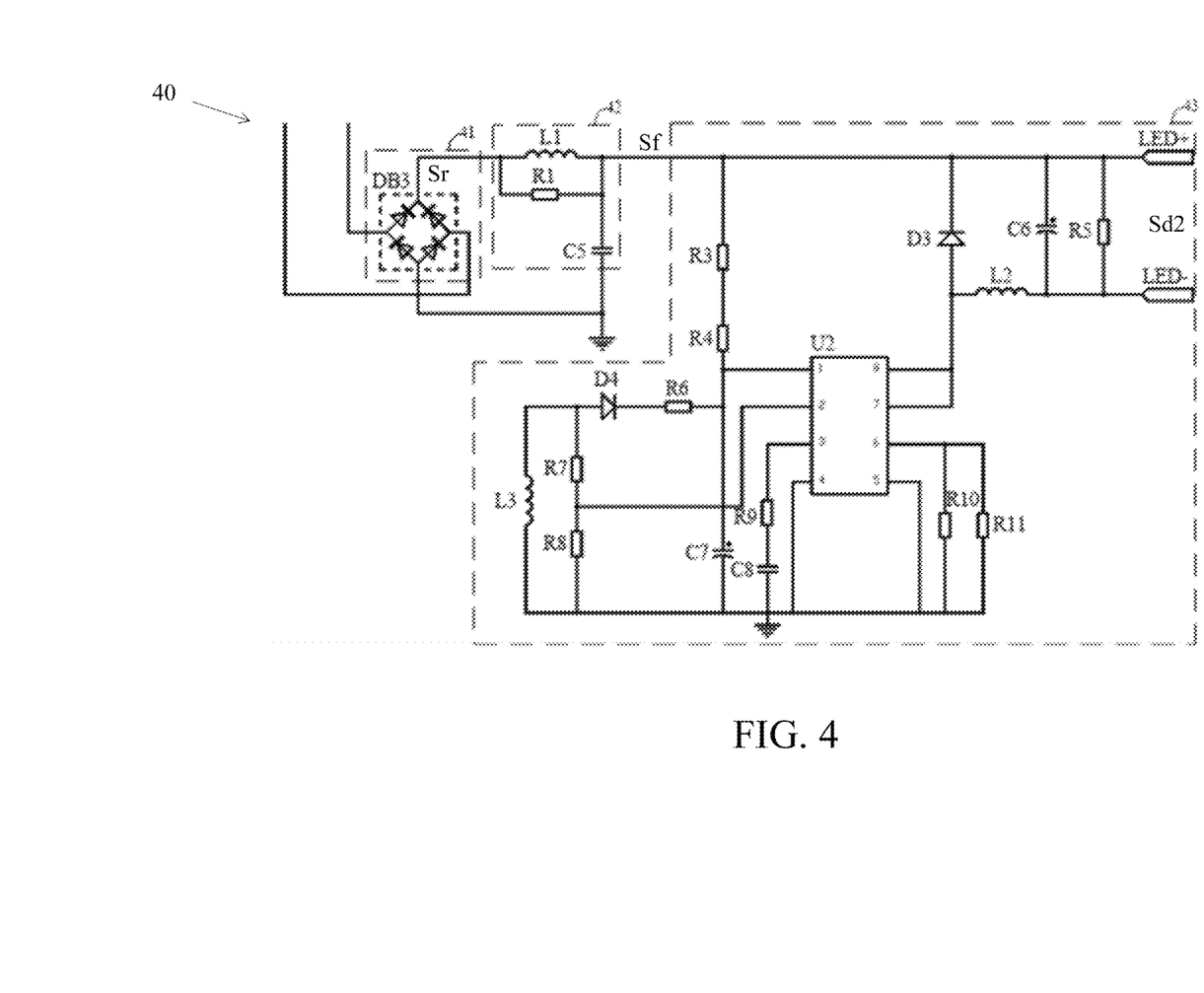
FIG. 4 is a diagram illustrating a second driving unit in accordance with some embodiments.

FIG. 4 is a diagram illustrating the second driving unit 40 in accordance with some embodiments. The second driving unit 40 comprises the rectifying circuit 41, the filtering circuit 42, and the voltage level converting circuit 43. The rectifying circuit 41 comprises a rectifier DB3. The rectifier DB3 comprises four diodes connected in a circle. The rectifier DB3 has a first terminal coupled to the second terminal of the inductor L6, a second terminal coupled to the second terminal of the inductor L7, a third terminal outputting the rectifying signal Sc, and a fourth terminal coupled to the ground voltage.

The filtering circuit 42 comprises an inductor L1, a resistor R1, and a capacitor C5. The inductor L1 has a first terminal coupled to the third terminal of the rectifier DB3 and a second terminal outputting the filtering signal Sf. The resistor R1 has a first terminal and a second terminal coupled to the first terminal and the second terminal of the inductor L1 respectively. The capacitor C5 has a first terminal coupled to the second terminal of the inductor L1, and a second terminal coupled to the ground voltage.

The voltage level converting circuit 43 comprises a pulse-width modulator (PWM) U2, a plurality of resistors R3, R4, R5, R6, R7, R8, R9, R10, R11, a plurality of capacitors C6, C7, C8, a plurality of inductors L2, L3, and a plurality of diodes D3, D4. The voltage level converting circuit 43 may be configured to be a Buck converter, a Boost converter, or a Buck-Boost converter. The pulse-width modulator U2 has eight pins. The resistors R3 and R4 are serially connected between the second terminal of the inductor L1 and the first pin (i.e. the number 1 in the pulse-width modulator U2) of the pulse-width modulator U2. The capacitor C7 is coupled between the first pin and the ground voltage. The resistor R6 has a first terminal coupled to the first pin, and a second terminal coupled to the cathode of the diode D4. The inductor L3 is coupled between the anode of the diode D4 and the ground voltage. The resistors R7 and R8 are serially connected between the anode of the diode D4 and the ground voltage. The second pin (i.e. the number 2 in the pulse-width modulator U2) of the pulse-width modulator U2 is coupled to the connecting node of the resistors R7 and R8. The resistor R9 and the capacitor C8 are serially connected between the third pin (i.e. the number 3 in the pulse-width modulator U2) of the pulse-width modulator U2 and the ground voltage. The fourth pin (i.e. the number 4 in the pulse-width modulator U2) and the fifth pin (i.e. the number 5 in the pulse-width modulator U2) of the pulse-width modulator U2 is coupled to the ground voltage. The resistors R10 and R11 are coupled between the sixth pin (i.e. the number 6 in the pulse-width modulator U2) of the pulse-width modulator and the ground voltage. The anode of the diode D3 is coupled to the seventh pin (i.e. the number 7 in the pulse-width modulator U2) and the eighth pin (i.e. the number 8 in the pulse-width modulator U2) of the pulse-width modulator U2. The cathode of the diode D3 is coupled to the anode (i.e. LED+) of the LED tube 2. A first terminal of the inductor L2 is coupled to the anode of the diode D3. The capacitor C6 has a first terminal coupled to a second terminal of the inductor L2, and a second terminal coupled to the cathode of the diode D3. The resistor R5 has a first terminal and a second terminal coupled to the first terminal and the second terminal of the capacitor C6 respectively. According to the embodiment, the second driving signal Sd2 is generated on the terminals LED+ and LED−, wherein the terminals LED+ and LED− are coupled to the anode and the cathode of the LED tube 2 respectively.

In practice, the operating modes of the LED driving circuit 100 may correspond to different connections of the first connecting port 10 and the second connecting port 20.

Figure 5:
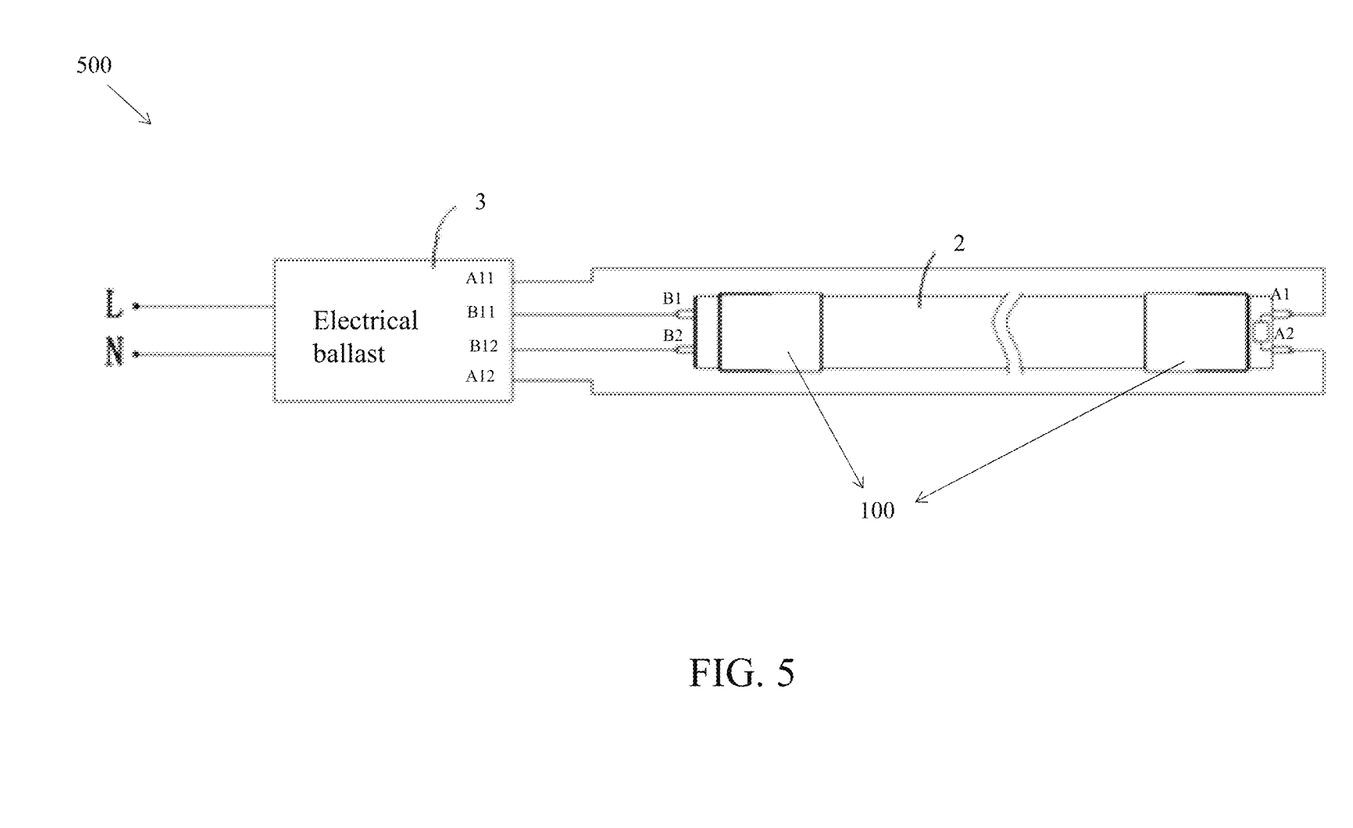
FIG. 5 is a diagram illustrating an LED apparatus when a second driving unit is configured to operate in the first operating mode in accordance with some embodiments.

FIG. 5 is a diagram illustrating an LED apparatus 500 when the second driving unit 100 is configured to operate in the first operating mode in accordance with some embodiments. The LED apparatus 500 is an LED illumination system. The LED apparatus 500 comprises an electrical ballast 3, the LED driving circuit 100, and the LED tube 2. The electrical ballast 3 comprises two connecting pins L and N on one side and four connecting pins A11, A12, B11, and B12 on the other side. The connecting pin L may be the hot wire, and the connecting pin N may be the neutral wire. The connecting pins L and N are coupled to the AC electric power supply, e.g. the AC electric power supply may be 110V AC power or 220 V AC power. The connecting pins A11 and A12 are coupled to the first terminal A1 and the second terminal A2 of the first connecting port 10 respectively. The connecting pins B11 and B12 are coupled to the first terminal B1 and the second terminal B2 of the second connecting port 20 respectively. During the first operating mode, the LED driving circuit 100 receives the first input signal and the second input signal generated by the electrical ballast 3 on the terminals A1, A2 and B1, B2 respectively. The electrical ballast 3 is arranged to generate the first input signal and the second input signal by limiting the amount of current of the AC electric power supply.

Please refer to FIG. 3 again, during the first operating mode, after the first filament simulation circuit 50 is pre-heated, the first input signal on the first terminal A1 and the second terminal A2 is passed to the switching control circuit 31 via the first filament simulation circuit 50. The switching control circuit 31 generates the control signal Sc according to the first input signal. The control signal Sc may be regarded as the supply power of the switching module 32. When the switching module 32 is conducted by electric, the switching module 32 may turn on the switch in the relay circuit K1 to generate the output signal So to the rectifying and filtering circuit 33. Then, the rectifying and filtering circuit 33 is conducted. Meanwhile, after the second filament simulation circuit 60 is pre-heated, the second input signal on the first terminal B1 and the second terminal B2 is passed to the rectifying and filtering circuit 33 via the second filament simulation circuit 60. Then, the rectifying and filtering circuit 33 is arranged to rectify and filter the signals received from the switching module 32 and the second filament simulation circuit 60 to generate the first driving signal Sd1 for driving the LED tube 2. According to some embodiments, a control circuit (not shown) may be arranged to disable the second driving unit 40 during the first operating mode.

Figure 6:
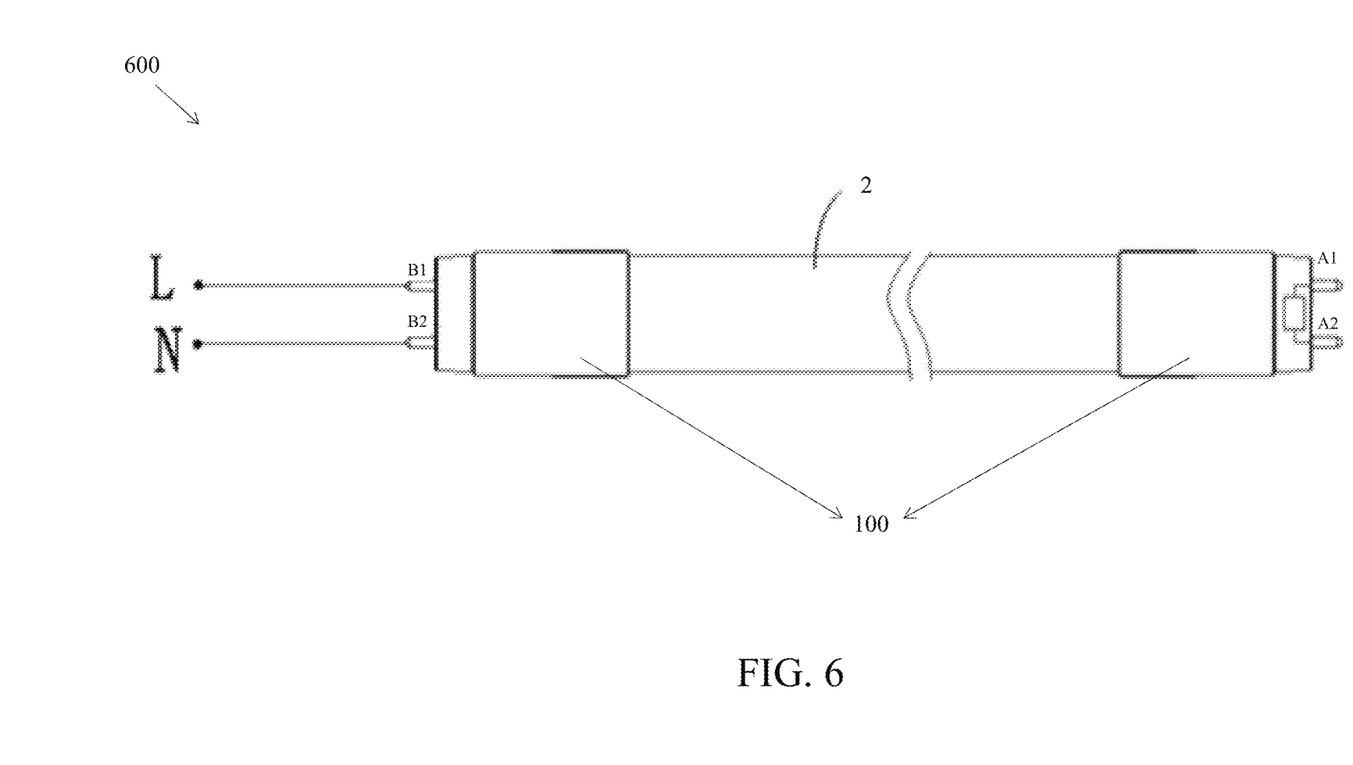
FIG. 6 is a diagram illustrating an LED apparatus when a second driving unit is configured to operate in the second operating mode in accordance with some embodiments.

FIG. 6 is a diagram illustrating an LED apparatus 600 when the second driving unit 100 is configured to operate in the second operating mode in accordance with some embodiments. The LED apparatus 600 is an LED illumination system. During the second operating mode, the first terminal B1 and the second terminal B2 of the second connecting port 20 of the second driving unit 100 is coupled to the connecting pins L and N respectively, and the connecting pins L and N are coupled to the AC electric power supply, e.g. the AC electric power supply may be 110V AC power or 220 V AC power. The first terminal A1 and the second terminal A2 of the first connecting port 10 of the second driving unit 100 are kept floating during the second operating mode.

Please refer to FIG. 3 and FIG. 4 again, during the second operating mode, the AC electric power supply on the first terminal B1 and the second terminal B2 is passed to the rectifying circuit 41 via the second filament simulation circuit 60. The rectifying circuit 41 generates the rectifying signal Sr according to the AC electric power supply. Then, the filtering circuit 42 is arranged to filter out the rectifying signal Sr to generate the filtering signal Sf. Then, the voltage level converting circuit 43 is arranged to generate the second driving signal Sd2 with constant current for driving the LED tube 2. According to some embodiments, a control circuit (not shown) may be arranged to disable the first driving unit 30 during the second operating mode.

Figure 7:
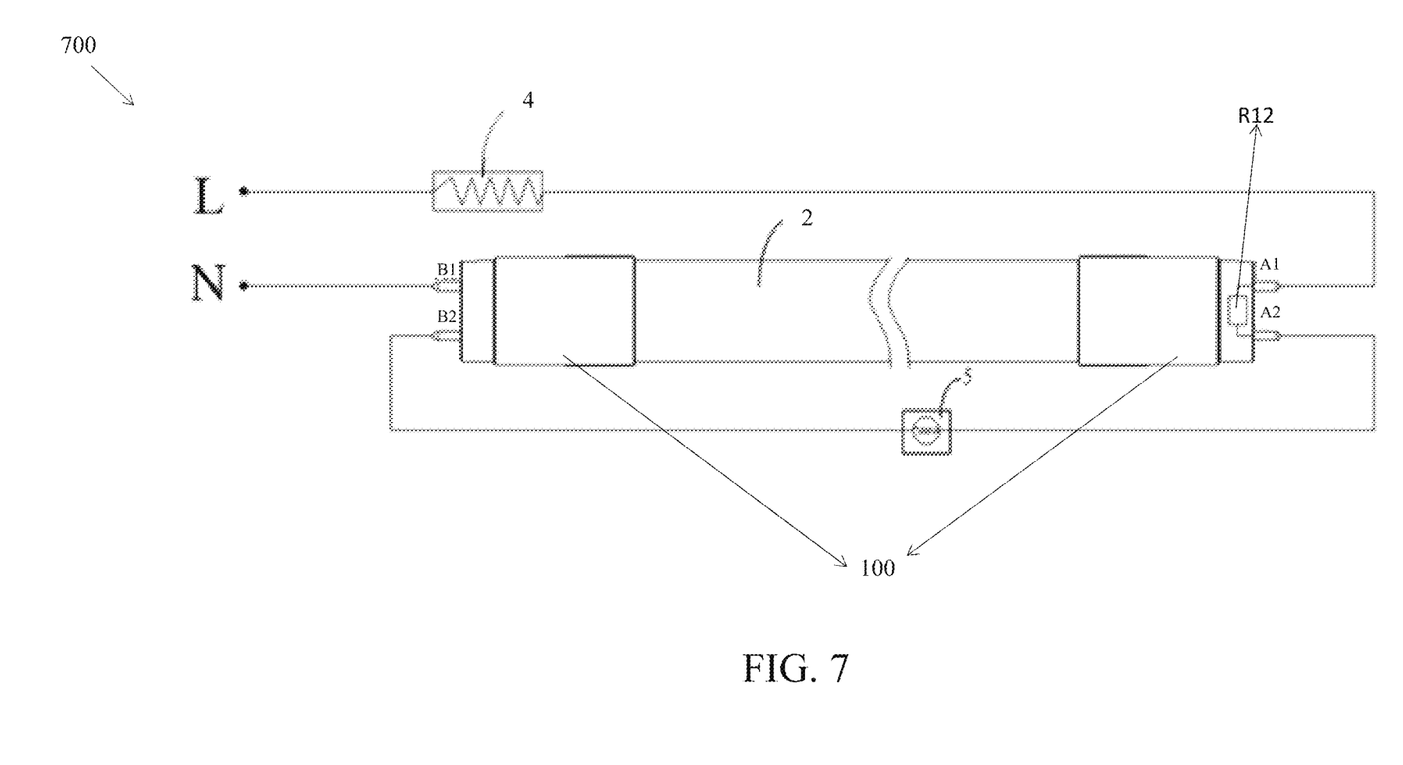
FIG. 7 is a diagram illustrating an LED apparatus when a second driving unit is configured to operate in the third operating mode in accordance with some embodiments.

FIG. 7 is a diagram illustrating an LED apparatus 700 when the second driving unit 100 is configured to operate in the third operating mode in accordance with some embodiments. The LED apparatus 600 is an LED illumination system. The LED apparatus 700 comprises an inductance ballast 4, the second driving unit 100, and a starter 5. The inductance ballast 4 comprises a first terminal coupled to the connecting pin L and a second terminal coupled to the first terminal A1 of the first connecting port 10. The starter may be an LED starter. The starter 5 comprises a first terminal coupled to the second terminal B2 of the second connecting port 20 and a second terminal coupled to the second terminal A2 of the first connecting port 10. The first terminal B1 of the second connecting port 20 is coupled to the connecting pin N. The connecting pins L and N are coupled to the AC electric power supply, e.g. the AC electric power supply may be 110V AC power or 220 V AC power.

Please refer to FIG. 3 and FIG. 4 again, during the third operating mode, the input terminal of the first terminal B1 and the second terminal B2 is the industrial-frequency signal. The inductive ballast 4 is arranged to generate the industrial-frequency signal by limiting the amount of current of the AC electric power supply. The industrial-frequency signal flows to the resistor R12 of the first filament simulation circuit 50. As the resistance of the resistor R12 is relatively low, most of the current of the industrial-frequency signal passes through the resistor R12 to reach the starter 5. The output signal of the starter 5 and the signal on the connecting pin N are received by the terminal B2 and B1 of the second connecting port 20. The received signal on the first terminal B1 and the second terminal B2 is passed to the rectifying circuit 41 via the second filament simulation circuit 60. The rectifying circuit 41 generates the rectifying signal Sr according to the received signal. Then, the filtering circuit 42 is arranged to filter out the rectifying signal Sr to generate the filtering signal Sf. Then, the voltage level converting circuit 43 is arranged to generate the second driving signal Sd2 with constant current for driving the LED tube 2. According to some embodiments, a control circuit (not shown) may be arranged to disable the first driving unit 30 during the third operating mode.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A driving circuit, comprising:
    a first connecting port, arranged to receive a first signal during a first operating mode;
    a second connecting port, arranged to receive a second signal during the first operating mode or receiving a third signal during a second operating mode;
    a first driving unit, coupled to the first connecting port and the second connecting port, for driving an LED element according to the first signal and the second signal during the first operating mode; and
    a second driving unit, coupled to the second connecting port, for driving the LED element according to the third signal during the second operating mode;
    wherein the second operating mode is different from the first operating mode, wherein the first driving unit comprises:
    a switching control circuit, having an input terminal coupled to the first connecting port and an output terminal for generating a control signal;
    a switching module, having an input terminal coupled to the output terminal of the switching control circuit, and an output terminal for outputting an output signal according to the control signal;
    a rectifying and filtering circuit, coupled to the output terminal of the switching module, for driving the LED element according to the output signal during the first operating mode, wherein the first connecting port and the second connecting port are arranged to receive a fourth signal and a fifth signal during a third operating mode, the second driving unit is arranged to drive the LED element according to the fourth signal and the fifth signal during the third operating mode, and the third operating mode is different from the first operating mode and the second operating mode; and a first filament simulation circuit, having a first input terminal coupled to a first terminal of the first connecting port, a second input terminal coupled to a second terminal of the first connecting port, and an output terminal coupled to the first driving unit; and a second filament simulation circuit, having a first input terminal coupled to a first terminal of the second connecting port, a second input terminal coupled to a second terminal of the second connecting port, a first output terminal coupled to the first driving unit and the second driving unit, and a second output terminal coupled to the second driving unit.

2. The driving circuit of claim 1, wherein the first driving unit is enabled and the second driving unit is disabled during the first operating mode, the first driving unit is disabled and the second driving unit is enabled during the second operating mode, and the first driving unit is disabled and the second driving unit is enabled during the third operating mode.

3. The driving circuit of claim 1, wherein the switching module comprises:

a relay circuit, configured to have a coil, a moving contact, and a stationary contact;

wherein the coil of the relay circuit is coupled to the switching control circuit, the moving contact of the relay circuit is coupled to the first connecting port, and the stationary contact of the relay circuit is coupled to the rectifying and filtering circuit for generating the output signal according to the control signal.

4. The driving circuit of claim 1, wherein the switching control circuit comprises:

a transformer, having a primary coil and a secondary coil, the primary coil coupled to the first connecting port, and the secondary coil magnetically coupled to the primary coil;

a first rectifier, coupled between the secondary coil of the transformer and a ground voltage, for generating a first rectifying signal;

a voltage converter, coupled to the first rectifier, having an output terminal for generating a converting output voltage according to the first rectifying signal;

a first capacitor, coupled to the primary coil of the transformer;

a second capacitor, coupled with the first rectifier in parallel;

a third capacitor, coupled between the output terminal of the voltage converter and the ground voltage; and a first Zener diode, coupled with the second capacitor in parallel.

5. The driving circuit of claim 4, wherein the rectifying and filtering circuit comprises:

a second rectifier, having a first input terminal coupled to the second connecting port and the first capacitor and a second input terminal coupled to the output terminal of the switching module, and having a first output terminal and a second output terminal for generating a second rectifying signal to drive the LED element during the first operating mode;

a second Zener diode, coupled between the first output terminal and the second output terminal of the second rectifier; and a fourth capacitor, coupled between the first output terminal and the second output terminal of the second rectifier.

6. The driving circuit of claim 1, wherein the second driving unit comprises:

a rectifying circuit, coupled to the second connecting port, for generating a rectifying signal;

a filtering circuit, coupled to the rectifying circuit, for filtering the rectifying signal to generate a filtering signal; and a voltage level converting circuit, coupled to the filtering circuit, for driving the LED element according to the filtering signal during the second operating mode and a third operating mode;

wherein the rectifying circuit, the filtering circuit, and the voltage level converting circuit are connected sequentially.

7. The driving circuit of claim 6, wherein the rectifying circuit comprises:

a rectifier, having a first input terminal and a second input terminal coupled to the second connecting port, a first output terminal outputting the rectifying signal, and a second output terminal coupled to a ground voltage.

8. The driving circuit of claim 6, wherein the filtering circuit comprises:

an inductor, having a first terminal coupled to the first output terminal of the rectifier and a second terminal outputting the filtering signal;

a resistor, having a first terminal and a second terminal coupled to the first terminal and the second terminal of the inductor respectively; and a capacitor, having a first terminal coupled to the second terminal of the inductor, and a second terminal coupled to the ground voltage.

9. The driving circuit of claim 1, wherein the first filament simulation circuit comprises:

a first resistor, having a first terminal and a second terminal coupled to the first terminal and the second terminal of the first connecting port respectively;

a first inductor, having a first terminal coupled to the first terminal of the first resistor;

a second inductor, having a first terminal coupled to the second terminal of the first resistor;

a second resistor, having a first terminal and a second terminal coupled to a second terminal of the first inductor and a second terminal of the second inductor respectively; and a capacitor, having a first terminal and a second terminal coupled to the second terminal of the first inductor and the second terminal of the second inductor respectively.

10. The driving circuit of claim 9, further comprising:

a fuse, having a first terminal coupled to the first terminal of the first connecting port, and a second terminal coupled to the first terminal of the first resistor.

11. The driving circuit of claim 1, wherein the second filament simulation circuit comprises:

a first inductor, having a first terminal coupled to the first terminal of the second connecting port;

a second inductor, having a first terminal coupled to the second terminal of the second connecting port;

a capacitor, having a first terminal and a second terminal coupled to a second terminal of the first inductor and a second terminal of the second inductor respectively;

a first resistor, having a first terminal coupled to the second terminal of the first inductor; and a second resistor, having a first terminal coupled to a second terminal of the first resistor, and a second terminal coupled to the second terminal of the second connecting port.

12. The driving circuit of claim 11, further comprising:
a fuse, having a first terminal coupled to the first terminal of the first connecting port, and a second terminal coupled to the first terminal of the first resistor.

13. A light emitting diode (LED) apparatus, comprising:
a first connecting port, arranged to selectively couple to the electrical ballast or an inductance ballast;
a second connecting port, arranged to selectively couple to the electrical ballast, an AC electric power supply, or the inductance ballast;
a first driving unit, coupled to the first connecting port and the second connecting port, for driving an LED element when the first connecting port and the second connecting port are coupled to the electrical ballast; and
a second driving unit, coupled to the second connecting port, for driving the LED element when the second connecting port is coupled to the AC electric power supply or when the first connecting port and the second connecting port are coupled to the inductance ballast and the AC electric power supply, wherein the first driving unit comprises:
a switching control circuit, having an input terminal coupled to the first connecting port and an output terminal for generating a control signal;
a switching module, having an input terminal coupled to input terminal of the switching control circuit, and an output terminal for outputting an output signal according to the control signal;
a rectifying and filtering circuit, coupled to the output terminal of the switching module, for driving the LED element according to the output signal during the first operating mode, wherein the first driving unit is enabled and the second driving unit is disabled when the first connecting port and the second port are coupled to the electrical ballast, the first driving unit is disabled and the second driving unit is enabled when the second connecting port is coupled to the AC electric power supply, and the first driving unit is disabled and the second driving unit is enabled when the first connecting port and the second connecting port are coupled to the inductance ballast and the AC electric power supply;
a first filament simulation circuit, having a first input terminal coupled to a first terminal of the first connecting port, a second input terminal coupled to a second terminal of the first connecting port, and an output terminal coupled to the first driving unit; and
a second filament simulation circuit, having a first input terminal coupled to a first terminal of the second connecting port, a second input terminal coupled to a second terminal of the second connecting port, a first output terminal coupled to the first driving unit and the second driving unit, and a second output terminal coupled to the second driving unit.

14. The LED apparatus of claim 13, wherein the second driving unit comprises:
a rectifying circuit, coupled to the second connecting port, for generating a rectifying signal;
a filtering circuit, coupled to the rectifying circuit, for filtering the rectifying signal to generate a filtering signal; and
a voltage level converting circuit, coupled to the filtering circuit, for driving the LED element according to the filtering signal during the second operating mode and the third operating mode;
wherein the rectifying circuit, the filtering circuit, and the voltage level converting circuit are connected sequentially.

* * * * *